United States Patent
Sexton et al.

(10) Patent No.: US 10,209,959 B2
(45) Date of Patent: Feb. 19, 2019

(54) HIGH RADIX 16 SQUARE ROOT ESTIMATE

(71) Applicant: Samsung Electronics Co., Ltd., Gyeonggi-do (KR)

(72) Inventors: Bonnie Collett Sexton, Austin, TX (US); James T. Longino, Austin, TX (US)

(73) Assignee: Samsung Electronics Co., Ltd. (KR)

(*) Notice: Subject to any disclaimer, the term of this patent is extended or adjusted under 35 U.S.C. 154(b) by 41 days.

(21) Appl. No.: 15/419,757

(22) Filed: Jan. 30, 2017

(65) Prior Publication Data

US 2018/0121167 A1    May 3, 2018

Related U.S. Application Data

(60) Provisional application No. 62/416,842, filed on Nov. 3, 2016, provisional application No. 62/416,846, filed on Nov. 3, 2016.

(51) Int. Cl.
*G06F 7/552* (2006.01)
*G06F 7/48* (2006.01)
*G06F 17/17* (2006.01)
*G06F 7/49* (2006.01)
*G06F 7/535* (2006.01)

(52) U.S. Cl.
CPC .......... *G06F 7/552* (2013.01); *G06F 7/4824* (2013.01); *G06F 7/49* (2013.01); *G06F 7/535* (2013.01); *G06F 17/17* (2013.01); *G06F 2207/48* (2013.01); *G06F 2207/552* (2013.01)

(58) Field of Classification Search
None
See application file for complete search history.

(56) References Cited

U.S. PATENT DOCUMENTS

| | | | |
|---|---|---|---|
| 4,939,686 A * | 7/1990 | Fandrianto | G06F 7/4824 708/605 |
| 5,132,925 A | 7/1992 | Kehl et al. | |
| 5,258,944 A | 11/1993 | Smith | |
| 5,696,712 A | 12/1997 | Prabhu et al. | |
| 5,954,789 A | 9/1999 | Yu et al. | |
| 6,108,682 A | 8/2000 | Matheny | |
| 6,311,261 B1 | 10/2001 | Chamdani et al. | |
| 6,782,405 B1 | 8/2004 | Matula et al. | |

(Continued)

OTHER PUBLICATIONS

Wang, A radix-16 combined complex division/square root unit with operand prescaling, IEEE Transactions on Computers, vol. 61, No. 9, Sep. 2012, pp. 1243-1255.

(Continued)

*Primary Examiner* — David H Malzahn
(74) *Attorney, Agent, or Firm* — The Farrell Law Firm, P.C.

(57) ABSTRACT

Apparatuses and methods of manufacturing same, systems, and methods for generating a starting estimate for radix-16 square root iterative calculation using hardware, including a radix-4 partial remainder-divisor (PD) table, which is used for both division and square root operations, are described. In one aspect, a part of a radicand for a radix-16 square root iterative operation is used to determine column/root and row/partial radicand values, which are then used to determine a starting estimate from a radix-4 PD table for the radix-16 square root iterative operation.

22 Claims, 8 Drawing Sheets

(56) References Cited

U.S. PATENT DOCUMENTS

| | | | |
|---|---|---|---|
| 7,016,930 B2 | 3/2006 | Hinds et al. | |
| 7,127,483 B2 | 10/2006 | Beaumont-Smith et al. | |
| 7,167,891 B2 | 1/2007 | Tang et al. | |
| 7,185,040 B2 | 2/2007 | Lee | |
| 7,543,008 B1 | 6/2009 | Matula et al. | |
| 7,809,784 B2 | 10/2010 | Lee | |
| 7,921,149 B2 | 4/2011 | Uesugi | |
| 8,868,633 B2 | 10/2014 | Lemonds et al. | |
| 8,898,215 B2 | 11/2014 | Amin et al. | |
| 8,914,431 B2* | 12/2014 | Carlough | G06F 7/5375 708/504 |
| 8,954,485 B2 | 2/2015 | Carlough et al. | |
| 2003/0074384 A1* | 4/2003 | Parviainen | G06F 1/035 708/654 |
| 2014/0067889 A1 | 3/2014 | Mortensen | |
| 2016/0110163 A1* | 4/2016 | Rarick | G06F 7/537 708/503 |
| 2016/0147503 A1 | 5/2016 | Burgess et al. | |
| 2016/0313976 A1* | 10/2016 | Dibrino | G06F 7/52 |
| 2016/0328207 A1 | 11/2016 | Sexton | |
| 2017/0017467 A1 | 1/2017 | Sexton | |
| 2018/0121167 A1* | 5/2018 | Sexton | G06F 7/552 |

OTHER PUBLICATIONS

Nannarelli, Radix-16 combined division and square root unit, 2011 20th IEEE Symposium on Computer Arithmetic, Technical Univ. of Denmark, Kongens Lyngby, Denmark, pp. 169-176.

Ercegovac, M. et al., Shared implementation of radix-10 and radix-16 division algorithm with limited precision primitives, 2011 Conference Record of the Forty Fifth Asilomar Conference on Signals, Systems and Computers (ASILOMAR) Year: 2011; pp. 1828-1832.

Nannarelli, Performance/power space exploration for binary64 division units, IEEE Transactions on Computers; May 2016, vol. 65, Issue: 5; pp. 1671-1677.

Liu, W. et al., Power efficient division and square root unit, IEEE Transactions on Computers, Aug. 2012, vol. 61, Issue: 8; pp. 1059-1070.

Lang, T. et al., Combined radix-10 and radix-16 division unit, 4 2007 Conference Record of the Forty-First Asilomar Conference on Signals, Systems and Computers Year: 2007; pp. 967-971.

Russinoff, Computation and formal verification of SRT quotient and square root digit selection tables, IEEE Trans. on Computers, Year: 2013, vol. 62, Issue: 5 Dept. of Central Verification, Advanced Micro Devices, Inc., Austin, TX, 13 pages.

Oberman, Minimizing the complexity of srt tables, IEEE Transactions on Very Large Scale Integration (VLSI) Systems, vol. 6, No. 1, Mar. 1998, pp. 141-149.

Petkovsek, Contiguous Digit Sets and Local Roundings, IEEE Transactions on Computers, 1989, pp. 136-143.

Pineiro, J. et al., High-radix iterative algorithm for powering computation, 16th IEEE Symposium on Computer Arithmetic, (ARITH'03), 8 pages, 2003.

Wang, C. et al., Design of a cycle-efficient 64B/32B integer divider using a table-sharing method, 2001 IEEE Int'l Conference on Electronics, pp. 921-924.

Fandrianto, Algorithm for high speed shared radix 8 division and radix 8 square root, Integrated Information Technology, Inc., Santa Clara, CA, 1989, pp. 68-75.

Fandrianto, Algorithm for high speed shared radix 4 division and radix 4 square root, Weitek Corp., Sunnyvale, CA, May 1987 IEEE, pp. 73-79.

Ercegovac, M. et al., On-the-fly conversion of redundant into conventional representation, IEEE Transactions on Computers, vol. C-36, No. 7, Jul. 1987, pp. 895-897.

Choo, I. et al., An accurate linear approximation method utilizing a bipartite reciprocal table for a floating point divider, IEEE Tx 2001, pp. 1199-1204.

Oberman et al., Design Issues in Division and Other Floating-Point Operations, IEEE Transactions on Computers, vol. 46, No. 2, Feb. 1997, pp. 154-161.

Atkins, Higher-radix division using estimates of the divisor and partial remainders, IEEE Transactions on Computers, vol. C-17, No. 10, Oct. 1968, pp. 925-934.

Antelo, E. et al., Digit-recurrence dividers with reduced logical depth, IEEE Transactions on Computers, vol. 54, No. 7, Jul. 2005, pp. 837-851.

* cited by examiner

```
                                   Divisor / ROOT
          0000 0001 0010 0011 0100 0101 0110 0111 1000 1001 1010 1011 1100 1101 1110 1111
 0101.01   X    X    X    X    X    X    X    X    X    X    X    X    X    X    X    X   +5.25
 0101.00   X    X    X    X    X    X    X    X    X    X    X    X    X    X    X   01   +5.00
 0100.11   X    X    X    X    X    X    X    X    X    X    X    X    X   01   01   01   +4.75
 0100.10   X    X    X    X    X    X    X    X    X    X    X   01   01   01   01   01   +4.50
 0100.01   X    X    X    X    X    X    X    X    X   01   01   01   01   01   01   01   +4.25
 0100.00   X    X    X    X    X    X    X    X   01   01   01   01   01   01   01   01   +4.00
 0011.11   X    X    X    X    X    X    X   01   01   01   01   01   01   01   01   01   +3.75
 0011.10   X    X    X    X   01   01   01   01   01   01   01   01   01   01   01   01   +3.50
 0011.01   X    X    X    X   01   01   01   01   01   01   01   01   01   01   01   01   +3.25
 0011.00   X    X    X   01   01   01   01   01   01   01   01   01   01   01   01   01   +3.00
 0010.11   X   01   01   01   01   01   01   01   01   01   01   01   01   01   01   01   +2.75   ODD
 0010.10  01   01   01   01   01   01   01   01   01   01   01   01   01   01   10   10   +2.50
 0010.01  01   01   01   01   01   01   01   01   01   01   10   10   10   10   10   10   +2.25
 0010.00  01   01   01   01   01   01   01   10   10   10   10   10   10   10   10   10   +2.00
 0001.11  01   01   01   01   01   10   10   10   10   10   10   10   10   10   10   10   +1.75
 0001.10  01   01   10   10   10   10   10   10   10   10   10   10   10   10   10   10   +1.50
 0001.01  10   10   10   10   10   10   10   10   10   10   10   10   10   10   10   10   +1.25
 0001.00  10   10   10   10   10   10   10   10   10   10   10   10   10   10   10   10   +1.00
 0000.11  10   10   10   10   10   10   10   10   10   10   10   10   10   10   10   10   +0.75
 0000.10  10   10   10   10   10   10   00   00   00   00   00   00   00   00   00   00   +0.50
 0000.01  00   00   00   00   00   00   00   00   00   00   00   00   00   00   00   00   +0.25
 0000.00  00   00   00   00   00   00   00   00   00   00   00   00   00   00   00   00   +0.00
            0    1    2    3    4    5    6    7    8    9   10   11   12   13   14   15

FIG. 3A 1111.11  00   00   00   00   00   00   00   00   00   00   00   00   00   00   00   00   -0.25
 1111.10  00   00   00   00   00   00   00   00   00   00   00   00   00   00   00   00   -0.50
 1111.01  10   10   10   10   10   10   00   00   00   00   00   00   00   00   00   00   -0.75
 1111.00  10   10   10   10   10   10   10   10   10   10   10   10   10   10   10   10   -1.00
 1110.11  10   10   10   10   10   10   10   10   10   10   10   10   10   10   10   10   -1.25
 1110.10  10   10   10   10   10   10   10   10   10   10   10   10   10   10   10   10   -1.50
 1110.01  01   01   10   10   10   10   10   10   10   10   10   10   10   10   10   10   -1.75
 1110.00  01   01   01   01   10   10   10   10   10   10   10   10   10   10   10   10   -2.00
 1101.11  01   01   01   01   01   10   10   10   10   10   10   10   10   10   10   10   -2.25
 1101.10  01   01   01   01   01   01   01   01   01   10   10   10   10   10   10   10   -2.50
 1101.01  01   01   01   01   01   01   01   01   01   01   01   01   01   10   10   10   -2.75
 1101.00  01   01   01   01   01   01   01   01   01   01   01   01   01   01   01   01   -3.00
 1100.11   X    X    X   01   01   01   01   01   01   01   01   01   01   01   01   01   -3.25
 1100.10   X    X    X    X   01   01   01   01   01   01   01   01   01   01   01   01   -3.50
 1100.01   X    X    X    X    X    X   01   01   01   01   01   01   01   01   01   01   -3.75
 1100.00   X    X    X    X    X    X    X   01   01   01   01   01   01   01   01   01   -4.00
 1011.11   X    X    X    X    X    X    X    X   01   01   01   01   01   01   01   01   -4.25
 1011.10   X    X    X    X    X    X    X    X    X   01   01   01   01   01   01   01   -4.50
 1011.01   X    X    X    X    X    X    X    X    X    X   01   01   01   01   01   01   -4.75
 1011.00   X    X    X    X    X    X    X    X    X    X    X   01   01   01   01   01   -5.00
 1010.11   X    X    X    X    X    X    X    X    X    X    X    X   01   01   01   01   -5.25
 1010.10   X    X    X    X    X    X    X    X    X    X    X    X    X    X    X    X   -5.50
          0000 0001 0010 0011 0100 0101 0110 0111 1000 1001 1010 1011 1100 1101 1110 1111
                                   Divisor / ROOT
```

FIG. 3B

Divisor / ROOT

| | 0000 | 0001 | 0010 | 0011 | 0100 | 0101 | 0110 | 0111 | 1000 | 1001 | 1010 | 1011 | 1100 | 1101 | 1110 | 1111 | |
|---|---|---|---|---|---|---|---|---|---|---|---|---|---|---|---|---|---|
| 0101.01 | X | X | X | X | X | X | X | X | X | X | X | X | X | X | X | X | +5.25 |
| 0101.00 | X | X | X | X | X | X | X | X | X | X | X | X | X | X | X | 01 | +5.00 |
| 0100.11 | X | X | X | X | X | X | X | X | X | X | X | X | X | 01 | 01 | 01 | +4.75 |
| 0100.10 | X | X | X | X | X | X | X | X | X | X | X | X | 01 | 01 | 01 | 01 | +4.50 |
| 0100.01 | X | X | X | X | X | X | X | X | X | X | 01 | 01 | 01 | 01 | 01 | 01 | +4.25 |
| 0100.00 | X | X | X | X | X | X | X | X | 01 | 01 | 01 | 01 | 01 | 01 | 01 | 01 | +4.00 |
| 0011.11 | X | X | X | X | X | X | X | 01 | 01 | 01 | 01 | 01 | 01 | 01 | 01 | 01 | +3.75 |
| 0011.10 | X | X | X | X | X | 01 | 01 | 01 | 01 | 01 | 01 | 01 | 01 | 01 | 01 | 01 | +3.50 |
| 0011.01 | X | X | X | X | 01 | 01 | 01 | 01 | 01 | 01 | 01 | 01 | 01 | 01 | 01 | 01 | +3.25 |
| 0011.00 | X | X | X | 01 | 01 | 01 | 01 | 01 | 01 | 01 | 01 | 01 | 01 | 01 | 01 | 01 | +3.00 |
| 0010.11 | X | 01 | 01 | 01 | 01 | 01 | 01 | 01 | 01 | 01 | 01 | 01 | 01 | 01 | 01 | 01 | +2.75 |
| 0010.10 | 01 | 01 | 01 | 01 | 01 | 01 | 01 | 01 | 01 | 01 | 01 | 01 | 01 | 01 | 10 | 10 | +2.50 |
| 0010.01 | 01 | 01 | 01 | 01 | 01 | 01 | 01 | 01 | 01 | 01 | 10 | 10 | 10 | 10 | 10 | 10 | +2.25 |
| 0010.00 | 01 | 01 | 01 | 01 | 01 | 01 | 01 | 10 | 10 | 10 | 10 | 10 | 10 | 10 | 10 | 10 | +2.00 |
| 0001.11 | 01 | 01 | 01 | 01 | 01 | 10 | 10 | 10 | 10 | 10 | 10 | 10 | 10 | 10 | 10 | 10 | +1.75 |
| 0001.10 | 01 | 01 | 10 | 10 | 10 | 10 | 10 | 10 | 10 | 10 | 10 | 10 | 10 | 10 | 10 | 10 | +1.50 |
| 0001.01 | 10 | 10 | 10 | 10 | 10 | 10 | 10 | 10 | 10 | 10 | 10 | 10 | 10 | 10 | 10 | 10 | +1.25 |
| 0001.00 | 10 | 10 | 10 | 10 | 10 | 10 | 10 | 10 | 10 | 10 | 10 | 10 | 10 | 10 | 10 | 10 | +1.00 |
| 0000.11 | 10 | 10 | 10 | 10 | 10 | 10 | 10 | 10 | 10 | 10 | 10 | 10 | 10 | 10 | 10 | 10 | +0.75 EVEN |
| 0000.10 | 10 | 10 | 10 | 10 | 10 | 10 | 00 | 00 | 00 | 00 | 00 | 00 | 00 | 00 | 00 | 00 | +0.50 |
| 0000.01 | 00 | 00 | 00 | 00 | 00 | 00 | 00 | 00 | 00 | 00 | 00 | 00 | 00 | 00 | 00 | 00 | +0.25 |
| 0000.00 | 00 | 00 | 00 | 00 | 00 | 00 | 00 | 00 | 00 | 00 | 00 | 00 | 00 | 00 | 00 | 00 | +0.00 |
| | 0 | 1 | 2 | 3 | 4 | 5 | 6 | 7 | 8 | 9 | 10 | 11 | 12 | 13 | 14 | 15 | |
| 1111.11 | 00 | 00 | 00 | 00 | 00 | 00 | 00 | 00 | 00 | 00 | 00 | 00 | 00 | 00 | 00 | 00 | -0.25 |
| 1111.10 | 00 | 00 | 00 | 00 | 00 | 00 | 00 | 00 | 00 | 00 | 00 | 00 | 00 | 00 | 00 | 00 | -0.50 |
| 1111.01 | 10 | 10 | 10 | 10 | 10 | 10 | 00 | 00 | 00 | 00 | 00 | 00 | 00 | 00 | 00 | 00 | -0.75 |
| 1111.00 | 10 | 10 | 10 | 10 | 10 | 10 | 10 | 10 | 10 | 10 | 10 | 10 | 10 | 10 | 10 | 10 | -1.00 |
| 1110.11 | 10 | 10 | 10 | 10 | 10 | 10 | 10 | 10 | 10 | 10 | 10 | 10 | 10 | 10 | 10 | 10 | -1.25 |
| 1110.10 | 10 | 10 | 10 | 10 | 10 | 10 | 10 | 10 | 10 | 10 | 10 | 10 | 10 | 10 | 10 | 10 | -1.50 |
| 1110.01 | 01 | 01 | 10 | 10 | 10 | 10 | 10 | 10 | 10 | 10 | 10 | 10 | 10 | 10 | 10 | 10 | -1.75 |
| 1110.00 | 01 | 01 | 01 | 01 | 01 | 10 | 10 | 10 | 10 | 10 | 10 | 10 | 10 | 10 | 10 | 10 | -2.00 |
| 1101.11 | 01 | 01 | 01 | 01 | 01 | 10 | 10 | 10 | 10 | 10 | 10 | 10 | 10 | 10 | 10 | 10 | -2.25 |
| 1101.10 | 01 | 01 | 01 | 01 | 01 | 01 | 01 | 01 | 01 | 01 | 10 | 10 | 10 | 10 | 10 | 10 | -2.50 |
| 1101.01 | 01 | 01 | 01 | 01 | 01 | 01 | 01 | 01 | 01 | 01 | 01 | 01 | 01 | 01 | 10 | 10 | -2.75 |
| 1101.00 | 01 | 01 | 01 | 01 | 01 | 01 | 01 | 01 | 01 | 01 | 01 | 01 | 01 | 01 | 01 | 01 | -3.00 |
| 1100.11 | X | X | X | 01 | 01 | 01 | 01 | 01 | 01 | 01 | 01 | 01 | 01 | 01 | 01 | 01 | -3.25 |
| 1100.10 | X | X | X | X | 01 | 01 | 01 | 01 | 01 | 01 | 01 | 01 | 01 | 01 | 01 | 01 | -3.50 |
| 1100.01 | X | X | X | X | X | X | 01 | 01 | 01 | 01 | 01 | 01 | 01 | 01 | 01 | 01 | -3.75 |
| 1100.00 | X | X | X | X | X | X | X | 01 | 01 | 01 | 01 | 01 | 01 | 01 | 01 | 01 | -4.00 |
| 1011.11 | X | X | X | X | X | X | X | X | 01 | 01 | 01 | 01 | 01 | 01 | 01 | 01 | -4.25 |
| 1011.10 | X | X | X | X | X | X | X | X | X | X | 01 | 01 | 01 | 01 | 01 | 01 | -4.50 |
| 1011.01 | X | X | X | X | X | X | X | X | X | X | X | X | 01 | 01 | 01 | 01 | -4.75 |
| 1011.00 | X | X | X | X | X | X | X | X | X | X | X | X | X | 01 | 01 | 01 | -5.00 |
| 1010.11 | X | X | X | X | X | X | X | X | X | X | X | X | X | X | X | 01 | -5.25 |
| 1010.10 | X | X | X | X | X | X | X | X | X | X | X | X | X | X | X | X | -5.50 |
| | 0000 | 0001 | 0010 | 0011 | 0100 | 0101 | 0110 | 0111 | 1000 | 1001 | 1010 | 1011 | 1100 | 1101 | 1110 | 1111 | |

Divisor / ROOT

S EEEEEEEE NNNNNNNNNNNNNNNNNNNNNNN  Radicand 610
 ↘ E NNN
         ⟶ 615

FIG. 6A

EVEN (120)

| E NNN | Out |
|---|---|
| 1000 | 0000 |
| 1001 | 0010 |
| 1010 | 0010 |
| 1011 | 0011 |
| 1100 | 0100 |
| 1101 | 0101 |
| 1110 | 0101 |
| 1111 | 0110 |

ODD (130)

| E NNN | Out |
|---|---|
| 0000 | 0111 |
| 0001 | 1001 |
| 0010 | 1010 |
| 0011 | 1011 |
| 0100 | 1100 |
| 0101 | 1110 |
| 0110 | 1110 |
| 0111 | 1111 |

EVEN (620)

| E NNN | Out |
|---|---|
| 1000 | 0010_0001 |
| 1001 | 0010_0001 |
| 1010 | 0010_0110 |
| 1011 | 0010_0110 |
| 1100 | 0010_0110 |
| 1101 | 0010_0110 |
| 1110 | 0010_0110 |
| 1111 | 0010_0110 |

ODD (630)

| E NNN | Out |
|---|---|
| 0000 | 0011_1011 |
| 0001 | 0011_1011 |
| 0010 | 0011_1011 |
| 0011 | 0101_0111 |
| 0100 | 0101_0111 |
| 0101 | 0101_0111 |
| 0110 | 0110_0010 |
| 0111 | 0110_0010 |

FIG. 6B

| E NNN NN | Out |
|---|---|
| 1000_?? | 0000 |
| 1001_?? | 0010 |
| 1010_?? | 0010 |
| 1011_?? | 0011 |
| 1100_?? | 0100 |
| 1101_?? | 0101 |
| 1110_?? | 0101 |
| 1111_?? | 0110 |

EVEN  660

| E NNN NN | Out |
|---|---|
| 0000_00 | 0110 |
| 0000_01 | 0111 |
| 0000_1? | 0111 |
| 0001_?? | 1001 |
| 0010_?? | 1010 |
| 0011_?? | 1011 |
| 0100_?? | 1100 |
| 0101_?? | 1110 |
| 0110_?? | 1110 |
| 0111_?? | 1111 |

670  ODD

FIG. 6C

HIGH RADIX 16 SQUARE ROOT ESTIMATE

PRIORITY

This application claims priority under 35 U.S.C. § 119(e) to U.S. Provisional Patent Application Ser. No. 62/416,842 filed on Nov. 3, 2016 and to U.S. Provisional Patent Application Ser. No. 62/416,846 filed on Nov. 3, 2016, the entire contents of both of which are incorporated herein by reference.

FIELD

The present disclosure relates generally to generating a starting estimate for radix-16 square root calculation using hardware used for both division and square root iterative operations, and more particularly, to selecting a starting estimate for radix-16 square root calculation using modified radix-4 look up tables (LUTs).

BACKGROUND

As computer applications grow increasingly complex, hardware architecture is increasingly burdened by the requirements of higher speed and taking up less space, while also trying to avoid becoming unworkably complex. One way to reduce resource usage is to use components and functionalities for multiple uses. The present application considers the sharing of components/functionalities to perform both division and square root calculations. To understand the components/functionalities involved, division is discussed first below.

Like most calculations performed by processors, division is implemented as an iterative process. One category of division iterative processes, or algorithms, are digit recurrence algorithms, which use subtraction to obtain the quotient/remainder. "Restoring" digit recurrence algorithms is similar to the iterative process of division by paper and pencil, where it is sometimes required to restore the original dividend by adding the divisor to it. Intuitively, it can be seen this requires a certain amount of memory, and, if dividing two n-digit numbers, can result in $2n$ additions/subtractions being performed.

"Nonrestoring" digit recurrence algorithms eliminate the restoration cycles, and only require up to n additions. This is accomplished by representing the quotient as a digital set of positive and negative integers, such as, e.g., $\{-n, \ldots, -1, 0, +1, \ldots, +n\}$, which is converted into binary form. In this way, small errors in one iteration can be corrected in subsequent iterations.

Sweeney, Robinson, and Tocher (SRT) division, which is widely used in computing, is a special set of nonrestoring digital recurrence algorithms which use a lookup table (LUT) rather than computing certain iterative calculations. In SRT division, the quotient q can be represented and rewritten as shown in Equations (1)(a)-(1)(d):

$$q = \frac{dividend}{divisor} \quad (1)(a)$$

$$dividend = (q \times divisor) + remainder \quad (1)(b)$$

such that $$|remainder| < |divisor| \times ulp \quad (1)(c)$$

and $$\text{sign(remainder)} = \text{sign(dividend)} \quad (1)(d)$$

where the input operands are given by dividend and divisor, and the results are q and remainder. The precision of the quotient is defined by the unit in the last position (u/p), where for an integer quotient u/p=1, and for a fractional quotient using a binary representation u/p=$2^{-n}$, assuming an n digit quotient. The radix r of the algorithm, typically chosen to be a power of 2, determines how many quotient bits are retired in each iteration, such that r=$2^b$. Accordingly, a radix r algorithm requires [n/b] iterations to compute an n digit quotient.

The following recurrence, as shown by Equations (2)(a)-(2)(b), is used at every iteration:

$$rP_o = dividend \quad (2)(a)$$

and $$P_{j+1} = rP_j - q_{j+1} divisor \quad (2)(b)$$

where $P_j$ is the partial remainder, or residual, at iteration j. In each iteration, one digit of the quotient is determined. See, e.g., Oberman and Flynn, *Minimizing the Complexity of SRT Tables*, IEEE Transactions of VLSI Systems, vol. 6, no. 1, pp. 141-149 (March 1998), the entire contents of which are incorporated herein by reference.

Using Equations (2)(a) and (2)(b), each iteration of the SRT division recurrence comprises the following steps:

1) determine next quotient-digit $q_{j+1}$ by the quotient-digit selection function;
2) generate the product $q_{j+1} \times$divisor; and
3) subtract $q_{j+1} \times$divisor from $r \times P_j$ to form the next partial remainder.

The quotient-digit function in step 1 is implemented by a LUT, known as a partial remainder-divisor (PD) table, as the LUT is based on the partial remainder and the divisor calculated in each iteration.

The square root function can be similarly implemented by an iterative process, in which the radicand is similar to the dividend, the partial radicand is similar to the partial remainder, and the root is similar in formation to the quotient. See, e.g., J. Fandrianto, *Algorithm for High Speed Shared Radix 4 Division and Radix 4 Square Root*, IEEE Symposium on Computer Arithmetic 1987, pp. 73-79, and J. Fandrianto, *Algorithm for High Speed Shared Radix 8 Division and Radix 8 Square Root*, IEEE Symposium on Computer Arithmetic 1989, pp. 68-75, the entire contents of both of which are incorporated herein by reference.

However, unlike SRT division, the square root operation does not have anything similar to the divisor, in terms of the starting point of the iterative process. In other words, a starting square root estimate must be generated in order to start the square root iterative process. Moreover, that starting estimate must ensure that the iterative process converges upon the square root using the same PD table as the SRT division operation.

SUMMARY

Accordingly, the present disclosure has been made to address at least the problems and/or disadvantages described herein and to provide at least the advantages described below.

According to an aspect of the present disclosure, a method is provided for generating a starting estimate for a radix-16 square root iterative operation, including determining, using at least a part of the radicand of the square root operation, a 4 bit column/root value for a partial remainder-divisor (PD) table using one or more column/root lookup tables (LUTs), where the PD table is used for both radix-16 square root and radix-16 division operations, the PD table comprising values for entries/cells within a folded positive-side radix-4 PD table, where the PD table may be used for both square root and division operations; determining, using the at least a part of the radicand, an 8 bit row/partial radicand value for the PD table using one or more row/partial radicand LUTs; and calculating, using an entry in the PD table indicated by the 4 bit column/root value and the 8 bit row/partial radicand value, a starting estimate for the radix-16 square root iterative operation.

According to an aspect of the present disclosure, an apparatus is provided which includes one or more non-transitory computer-readable media and at least one processor. The one or more non-transitory computer-readable media store a partial remainder-divisor (PD) table comprising values for entries/cells within a folded positive-side radix-4 PD table, where the radix-4 PD table may be used for both square root and division operations; one or more column/root lookup tables (LUTs), for which at least a portion of a radicand of a radix-16 square root operation is input and a 4 bit column/root value for the PD table is output; and one or more row/partial radicand LUTs, for which the at least a portion of the radicand is input and an 8 bit row/partial radicand value for the PD table is output. The at least one processor, when executing instructions stored on the one or more non-transitory computer readable media, calculates, using an entry in the PD table indicated by a 4 bit column/root value output from the one or more column/root LUTs when at least a part of a radicand of a square root operation is input and an 8 bit row/partial radicand value output from the one or more column/root LUTs when the at least the part of a radicand is input, a starting estimate for a radix-16 square root iterative operation based on the radicand.

According to an aspect of the present disclosure, a method is provided for manufacturing a chipset, which includes one or more non-transitory computer-readable media and at least one processor. The one or more non-transitory computer-readable media store a partial remainder-divisor (PD) table comprising values for entries/cells within a folded positive-side radix-4 PD table, where the radix-4 PD table may be used for both square root and division operations; one or more column/root lookup tables (LUTs), for which at least a portion of a radicand of a radix-16 square root operation is input and a 4 bit column/root value for the PD table is output; and one or more row/partial radicand LUTs, for which the at least a portion of the radicand is input and an 8 bit row/partial radicand value for the PD table is output. The at least one processor, when executing instructions stored on the one or more non-transitory computer readable media, calculates, using an entry in the PD table indicated by a 4 bit column/root value output from the one or more column/root LUTs when at least a part of a radicand of a square root operation is input and an 8 bit row/partial radicand value output from the one or more column/root LUTs when the at least the part of a radicand is input, a starting estimate for a radix-16 square root iterative operation based on the radicand.

According to an aspect of the present disclosure, a method for testing an apparatus includes testing whether the apparatus has one or more non-transitory computer-readable media which store a partial remainder-divisor (PD) table comprising values for entries/cells within a folded positive-side radix-4 PD table, where the radix-4 PD table may be used for both square root and division operations; one or more column/root lookup tables (LUTs), for which at least a portion of a radicand of a radix-16 square root operation is input and a 4 bit column/root value for the PD table is output; and one or more row/partial radicand LUTs, for which the at least a portion of the radicand is input and an 8 bit row/partial radicand value for the PD table is output; and testing whether the apparatus has at least one processor which, when executing instructions stored on the one or more non-transitory computer readable media, calculates, using an entry in the PD table indicated by a 4 bit column/root value output from the one or more column/root LUTs when at least a part of a radicand of a square root operation is input and an 8 bit row/partial radicand value output from the one or more column/root LUTs when the at least the part of a radicand is input, a starting estimate for a radix-16 square root iterative operation based on the radicand.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 3A and 3B both show the same radix-4 PD table, where FIG. 3A illustrates how the starting estimate of the square root value according to an odd radicand is determined, while FIG. 3B illustrates how the starting estimate of the square root value according to an even radicand is determined, according to embodiments of the present disclosure;

FIG. 6A shows a 32 bit radicand according to the IEEE-754 standard, and the bits of the 32 bit radicand and the even and odd tables used to select the column value to generate the starting estimate for the square root operation according to a radix-16 embodiment of the present disclosure;

FIG. 6B shows the even and odd tables used to select the row value for generating the starting estimate for a radix-16 square root operation according to an embodiment of the present disclosure;

FIG. 6C shows the even and odd tables used to change the column value for the starting estimate for the square root operation for the special case of 0000 according to a radix-16 embodiment of the present disclosure;

DETAILED DESCRIPTION

Figure 1:
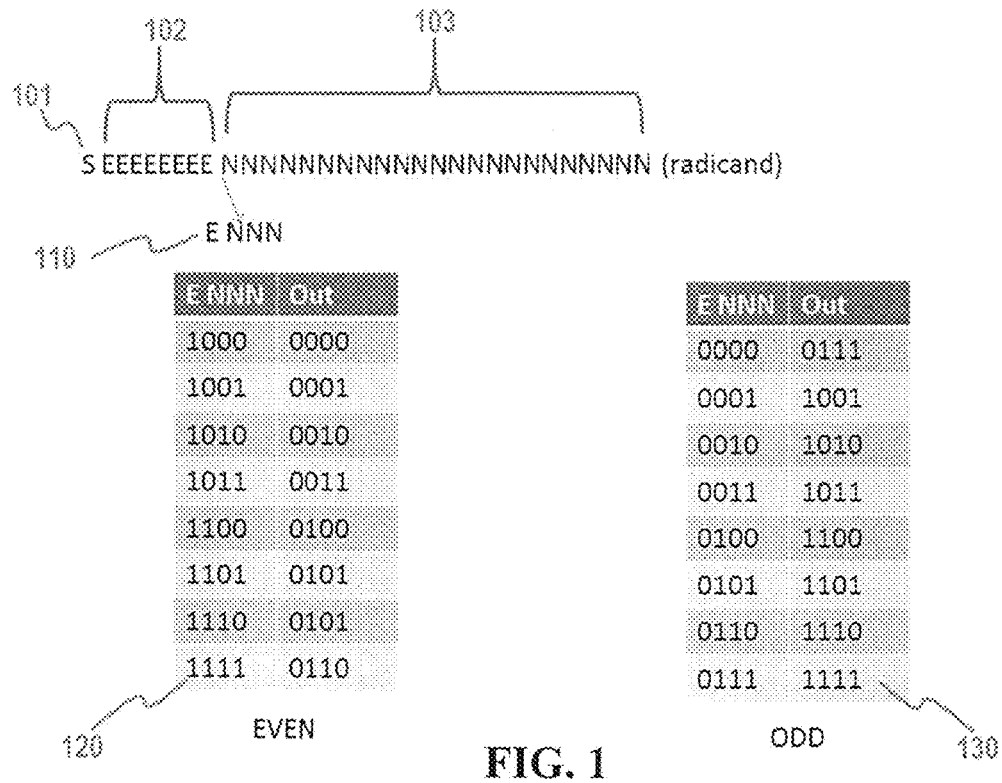
FIG. 1 shows a radicand as a 32 bit single precision floating point decimal value according to the IEEE-754 standard, and the bits of a 32 bit radicand and the even and odd tables used to generate the starting estimate for the square root operation according to a radix-4 embodiment of the present disclosure.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

According to one embodiment of the present disclosure, a starting estimate for radix-16 square root iterative calculation using shared hardware for divide/square root functions is determined based on one or more tables used for radix-4 divide/square root operations, but altered to reflect the higher number of bits in the radix-16 starting estimate (radix-4 only needs a two bit starting estimate, while radix-16 needs a four bit starting estimate).

FIGS. 1 through 3B show how the starting estimate for the radix-4 square root operation is determined according to an embodiment of the present disclosure.

In FIG. 1, the radicand of the square root function is shown in the 32 bit single precision computer format according to the IEEE-754 standard (which is incorporated by reference herein in its entirety), in which bit 32 is the sign (S) 101, bits 31-24 are the exponent (E) 102, and bits 23-1 are the mantissa, also known as the fraction or significand, (N) 103. The fraction/mantissa in the IEEE-754 format has an "invisible" leading bit (i.e., not stored) of value 1.0, as shown by the "(1)" in numerals 225 and 235 of FIG. 2, which means the value of the fraction/mantissa is between 1.0 and 2, and accordingly, bit 23 has a value of ½, bit 22 has a value of ¼, etc. In embodiments of the present disclosure, when the lowest significant bit (LSB) in the exponent is 1, the representation is considered "even", and when the exponent LSB is 0, it is considered "odd".

As shown in FIG. 1, the three most significant bits (MSBs) of the mantissa/fraction 103 and the LSB of exponent 102 are used as input (E NNN) 110 to either an EVEN table 120 or an ODD table 130 based on the value of the exponent LSB (E) being 1 (even) or 0 (odd), respectively. The EVEN table 120 and the ODD table 130 show the output for each possible input (E NNN) 110 value.

Figure 2:
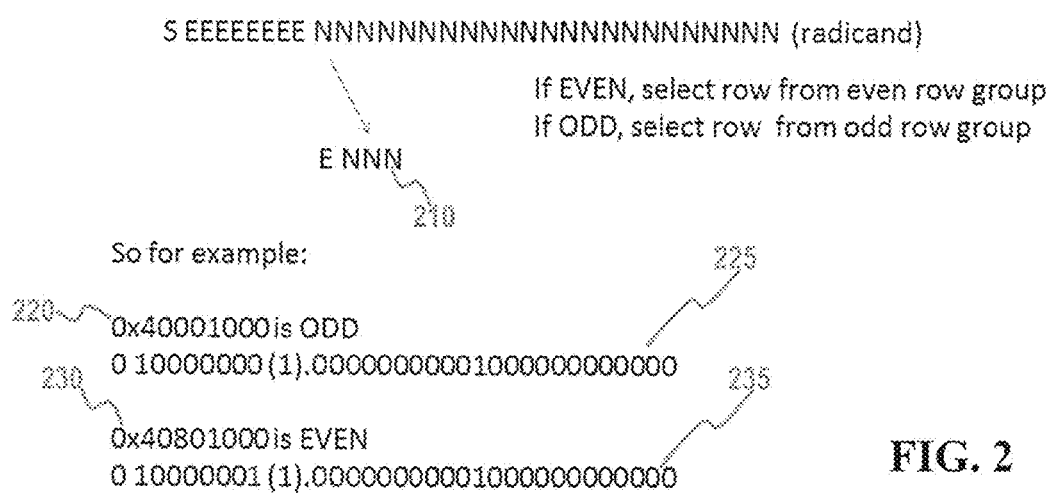
FIG. 2 shows the 32 bit radicand according to the IEEE-754 standard, the bits of the 32 bit radicand used to generate the starting estimate for the square root operation according to a radix-4 embodiment of the present disclosure, and examples of odd and even radicands.

FIG. 2 also shows the 32-bit radicand according to the IEEE-754 standard and the bits (E NNN) 210 used as input to either the EVEN table 120 or the ODD table 130. FIG. 2 also shows two examples of radicands, where one is odd and the other is even. More specifically, 220 indicates the hexadecimal representation and 225 indicates the 32 bit binary representation of the number with decimal value 2.0009766. Since the exponent LSB of the 32-bit binary representation 225 is 0, the radicand of decimal value 2.0009766 is considered odd. Similarly, 230 indicates the hexadecimal representation and 235 indicates the 32 bit binary representation of the number with decimal value 4.001953. Since the exponent LSB of the 32-bit binary representation 235 is 1, the radicand of decimal value 4.001953 is considered even.

The same radix-4 PD table 300 is shown in both FIGS. 3A and 3B according to an embodiment of the present disclosure, where FIG. 3A also illustrates the determination of the square root estimate with an odd radicand and FIG. 3B also illustrates the determination of the square root estimate with an even radicand according to embodiments of the present disclosure. One radix-4 PD table according to the present disclosure is described in U.S. patent application Ser. No. 14/972,077, entitled "PARTIAL REMAINDER/DIVISOR TABLE SPLIT IMPLEMENTATION" and filed on Dec. 16, 2015, which is incorporated by reference herein in its entirety. An example of an overall division/square root architecture to which the present disclosure could be applied is described in U.S. patent application Ser. No. 14/996,216, entitled "INTEGER/FLOATING POINT DIVIDER AND SQUARE ROOT LOGIC UNIT AND ASSOCIATED METHODS" and filed on Jan. 14, 2016, which is incorporated by reference herein in its entirety.

PD tables, which are usually stored as lookup tables (LUTs), are used to generate the quotient estimate in each iteration of the recursive processes by selecting the cell indicated by the column and row of the previous divisor/root and partial remainder/radicand, respectively. The negative binary values in the radix-4 PD table 300 are in "two's complement" format. The radix-4 PD table 300 cannot be "folded" in its present form, meaning that the radix-4 PD table 300 is not perfectly symmetrical around the line 305 between the "positive" zero value row and the first negative value row. In other words, because, for example, a cell 301 on the positive side is a non-value ("X") while a corresponding cell 303 on the negative side is a "01", the radix-4 PD table 300 cannot be folded.

In practice, PD tables are saved in foldable form—or, more exactly, the upper half of a "foldable" PD table is saved in the LUT. Where there is not perfect symmetry (which is always the case), such as at the cells 301 and 303, extra steps/techniques are used to ensure the correct value is given, as discussed more fully below.

As stated above, FIG. 3A illustrates an example of how the initial square root estimate is determined with an odd radicand. More specifically, the arrow in FIG. 3A points to the column with the root/divisor value of "0111", in accordance with the odd radicand example 220/225 in FIG. 2. As shown in FIG. 2, the odd radicand example 220/225 has the E NNN binary input value of "0000", which, according to the ODD table 120 in FIG. 1, results in an output "0111" being used for the column value, as shown in FIG. 3A. In terms of increasing the likelihood of convergence, a middle value is selected as the row value in the radix-4 PD table, in this case, the row/partial remainder/radicand value "0001.00". With those row and column values, the two bits "10" in cell entry 355 are the starting estimate for the iterative square root operation according to an embodiment of the present disclosure.

FIG. 3B illustrates an example of how the initial square root estimate is determined with an even radicand according to embodiments of the present disclosure. The arrow in FIG. 3B points to the column with the root/divisor value of "0000", in accordance with the even radicand example 230/235 in FIG. 2. As shown in FIG. 2, the even radicand example 230/235 has the E NNN binary input value of "0000", which, according to the EVEN table 130 in FIG. 1, results in an output "0000" being used for the column value, as shown in FIG. 3B. In terms of increasing the likelihood of convergence, a middle value is selected as the row value in the radix-4 PD table, in this case, the row/partial remainder/radicand value "0010.00". With those row and column values, the two bits "01" in cell entry 350 are the starting estimate for the iterative square root operation according to an embodiment of the present disclosure.

According to an embodiment of the present disclosure, the row and column of the radix-4 PD table are held for only one cycle, and then the iterative square root process begins. According to another embodiment, the row and column of the radix-4 PD table are held for the first cycle, the column is changed in the second cycle, and then the iterative square root process begins.

Figure 4:
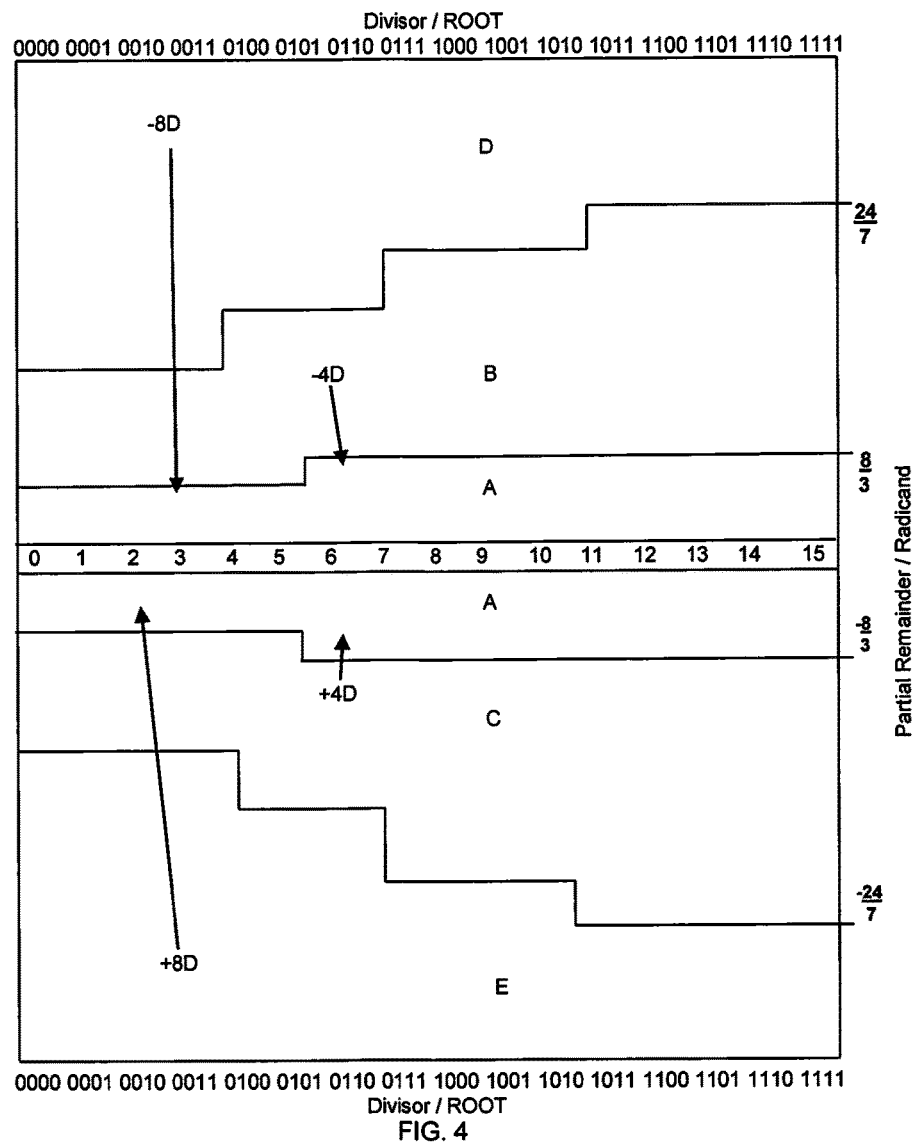
FIG. 4 is a PD table for a radix-16 square root operation according to an embodiment of the present disclosure.

FIG. 4 shows a radix-16 PD table 400 according to an embodiment of the present disclosure. The radix-16 PD table 400 has five regions A, B, C, D, and E. Region A is the same as the radix-4 PD table 300 in FIGS. 3A and 3B. When used in the radix-16 environment, the two-bit entries shown in the radix-4 PD table 300 (region A) are translated into four bits, as discussed in further detail below.

As region A corresponds to a modified form of the radix-4 PD table 300 in FIGS. 3A and 3B, regions B, C, D, and E, can be seen as expansions to larger size PD tables. For that viewpoint, regions B and C correspond to the expansion required for a radix-8 PD table and regions D and E correspond to the expansion required for a radix-16 PD table. In embodiments of the present disclosure, the cell/entries for regions B, C, D, and E are not stored, and the 4-radix-PD table region A is used in determining all cell/entry values in a radix-16 implementation.

According to an embodiment of the present disclosure, when a value is an entry/cell in regions B, C, D, or E, that value is reduced over one or more cycles to a value of an entry/cell in region A. In this manner, only the cell values of region A need to be kept in a LUT, and the range of values in the other regions are defined only by their boundaries. Accordingly, a radix-4 PD table such as a radix-4 PD table 300 (in modified form) can be used to represent the cell values for a full radix-16 PD table as represented by the radix-16 PD table 400 in FIG. 4.

For example, if the entry/cell of a value falls within region E, the value is adjusted by +8D, thus bringing the value within region A. Likewise, if the entry/cell of a value falls within region D, the value is adjusted by −8D; if the entry/cell of a value falls within region C, the value is adjusted by +4D; and if the entry/cell of a value falls within region B, the value is adjusted by −4D. This is a simplified overview, some minor adjustments may need to be made in certain instances to return the value to region A, as is discussed below.

Hereinafter, even though the PD table serves both operations (division and square root), the columns may be referred to as columns/roots (instead of columns/roots/divisors), and the rows may be referred to as rows/partial remainders (instead of rows/partial dividend/partial remainder) in the present disclosure.

Because of the necessary reduction in overall size (the full-size radix-16 PD table has 4064 entries) to fit a letter-size page, FIG. 4 does not accurately represent the exact boundaries between regions. In fact, the boundaries are all ragged/stepped and are defined as shown in Table 1 below, and as indicated by the outer markings on the right-hand side of FIG. 4. Thus, in order to obtain the positive upper boundary of region A (radix-4), multiply the column/root value by 8/3 in each column. Similarly, for the positive upper boundary of region B (radix-8), multiply the column/root by 24/7 in each column. To obtain each step/column on the negative side, the same procedure is used. The upper boundary of region D (radix-16) is not shown as it approaches a "don't care" zone where the values are the same or discarded. However, in a radix-32 or radix-512 implementation, those boundaries would need to defined as well.

Figure 5:
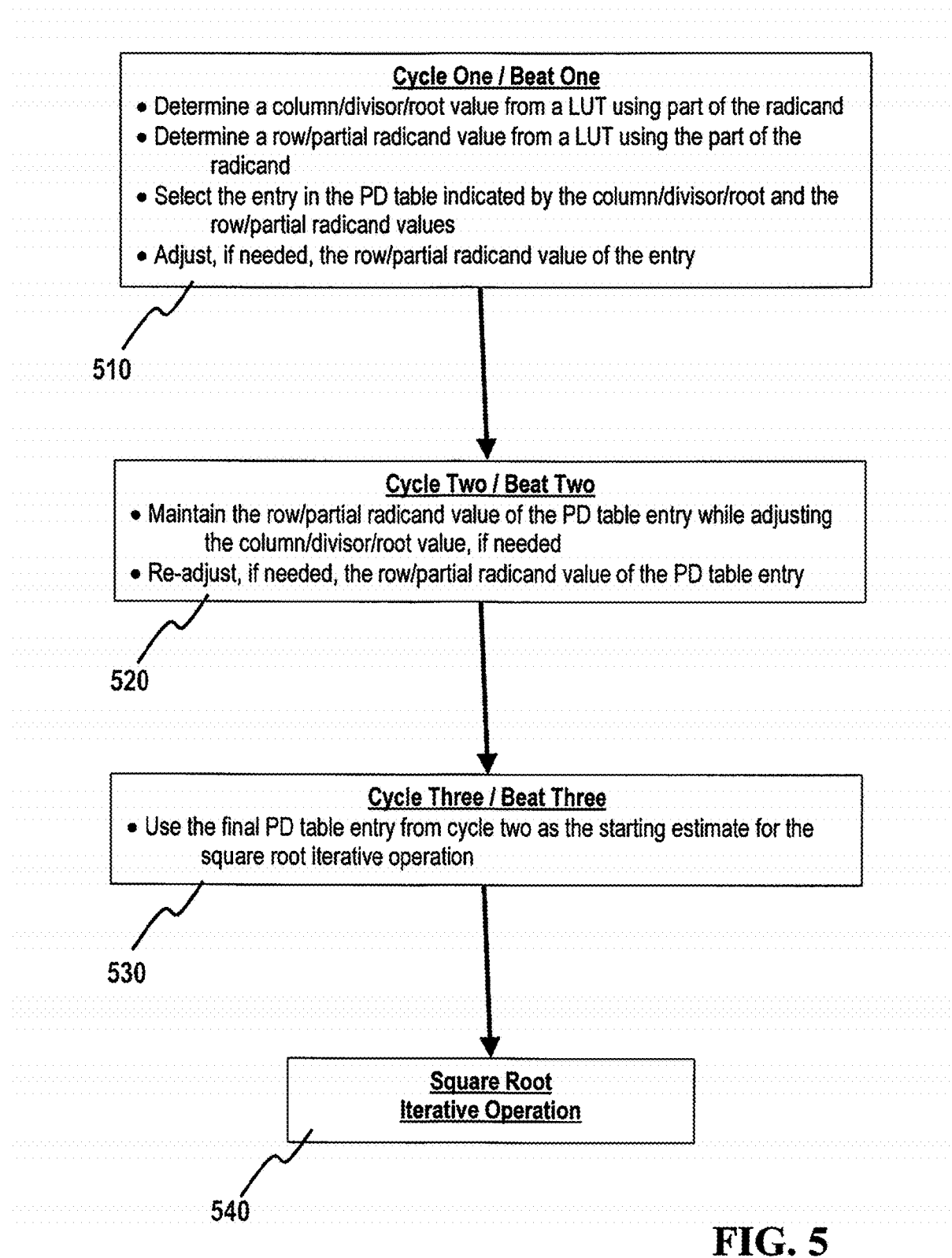
FIG. 5 is a flowchart of a method for generating a starting estimate for a radix-16 square root operation according to an embodiment of the present disclosure.

FIG. 5 is a flowchart of a method for generating a starting estimate for a radix-16 square root operation according to an embodiment of the present disclosure. FIGS. 6A-6C are tables that can be used in performing some of the operations shown in FIG. 5.

In the first cycle or first beat (510 of FIG. 5) of a radix-16 square root operation according to an embodiment of the present disclosure, several operations are performed. One is the determination of the 4 bit column/divisor/root value from a LUT using part of the radicand. As shown in the example illustrated by FIG. 6A, the same EVEN and ODD tables 120 and 130 from the radix-4 square root operation are used. In FIG. 6A, the LSB of the exponent and the three most significant bits (MSBs) of the mantissa/fraction of the IEEE-754 32 bit radicand 610 are used as input (E NNN) 615 to either EVEN table 120 or ODD table 130 based on the value of the exponent LSB (E) being either 1 (even) or 0 (odd), respectively.

Also in the first cycle or first beat (510 of FIG. 5) of a radix-16 square root operation according to an embodiment of the present disclosure, the 8-bit row/partial radicand value is determined from a LUT using the same part of the radicand used in FIG. 6A. FIG. 6B illustrates an EVEN table 620 and an ODD table 630 which are used to select the 8-bit row/partial radicand value using the same part (E NNN) of the radicand used in FIG. 6A. Either the EVEN table 620 or the ODD table 630 are used based on the value of the exponent LSB (E) being either 1 (even) or 0 (odd), respectively, in the E NNN value from the radicand.

Accordingly, the first two operations of the first cycle or first beat (510 of FIG. 5) of a radix-16 square root operation according to an embodiment of the present disclosure generate a 4-bit column/divisor/root value and an 8-bit row/partial radicand value—i.e., the coordinates of an entry/cell in the radix-16 PD table 400.

If that entry/cell is in region A of the radix-16 PD table 400, no further adjustments need be made until the second cycle/beat 520. However, if that entry/cell is in any of the other regions of the radix-16 PD table 400, adjustments need be made. More specifically, as mentioned above, if the entry/cell of a value falls within region E, the value is adjusted by +8D, thus bringing the value within region A. Likewise, if the entry/cell of a value falls within region D, the value is adjusted by −8D; if the entry/cell of a value falls within region C, the value is adjusted by +4D; and if the entry/cell of a value falls within region B, the value is adjusted by −4D. As also mentioned above, this is a simplified overview, and other adjustments may be needed to correct for the non-symmetric nature of the original PD table.

In the second cycle or second beat (520 of FIG. 5) of a radix-16 square root operation according to an embodiment of the present disclosure, the 8-bit row/partial radicand value at the end of the first cycle/beat is maintained and adjustments, if necessary, are made to the 4-bit column/root value. This is only done if the 4-bit column/root value leads to cell/entry value which is subject to the non-symmetric nature of the "fold" of region A (radix-4) discussed above and needs to be replaced. In one embodiment, this is determined by a quick comparison of the found value with ranges of non-symmetric cell/entry values stored in one or more LUTs in the first cycle (510 of FIG. 5). If the value is non-symmetric, it is stored for correction/modification in the second cycle/beat (520 of FIG. 5).

For example, the 4-bit column/divisor/root value may be 0000, which can be an odd case because of various non-symmetric-valued cell/entries that do not fit the folding property used to reduce the memory required to store the radix-16 PD table. In such a case, the EVEN table 660 and ODD table 670 in FIG. 6C may be used to adjust the 4-bit column/root value to another value ("Out"). More specifically, the original partial radicand value E NNN is used again, but with the next two bits of the mantissa/fraction added at the end ("E NNN NN"). Once again, depending on whether the E was even (1) or odd (0), either the EVEN table 660 or the ODD table 670 is used to find a new 4-bit column/root value ("Out"). Depending on the new column, the 8-bit row/partial radicand value may also need to be adjusted to, inter alia, get back into region A.

If no adjustments are necessary, nothing is done in second cycle/beat 520.

In the third cycle/beat (530 of FIG. 5), the final PD table entry from the second cycle/beat 520 becomes the starting estimate for the square root iterative operation.

Figure 7A:
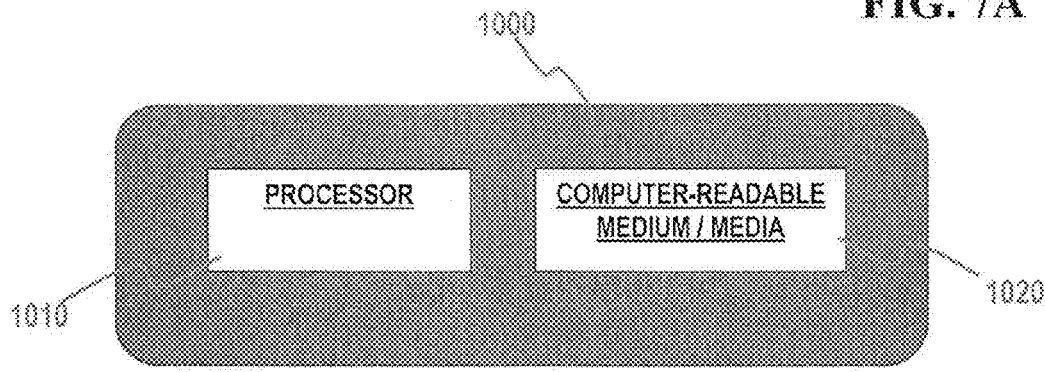
FIG. 7A illustrates an exemplary apparatus according to an embodiment of the present disclosure.

FIG. 7A illustrates an apparatus according to an embodiment of the present disclosure. An apparatus 1000 includes at least one processor 1010 and one or more non-transitory computer readable media 1020. The one or more non-transitory computer-readable media store a partial remainder-divisor (PD) table used for both radix-16 square root and radix-16 division iterative operations, one or more column/root lookup tables (LUTs), for which at least a portion of a radicand of a radix-16 square root operation is input and a column/root value for the PD table is output, and one or more row/partial radicand LUTs, for which the at least a portion of the radicand is input and a row/partial radicand value for the PD table is output.

The at least one processor 1010, when executing instructions stored on the one or more non-transitory computer readable media 1020, performs the step of calculating, using an entry in the PD table indicated by a 4 bit column/root value output from the one or more column/root LUTs when at least a part of a radicand of a square root operation is input and an 8 bit row/partial radicand value output from the one or more column/root LUTs when the at least a part of a radicand is input, a starting estimate for a radix-16 square root iterative operation based on the radicand.

Figure 7B:
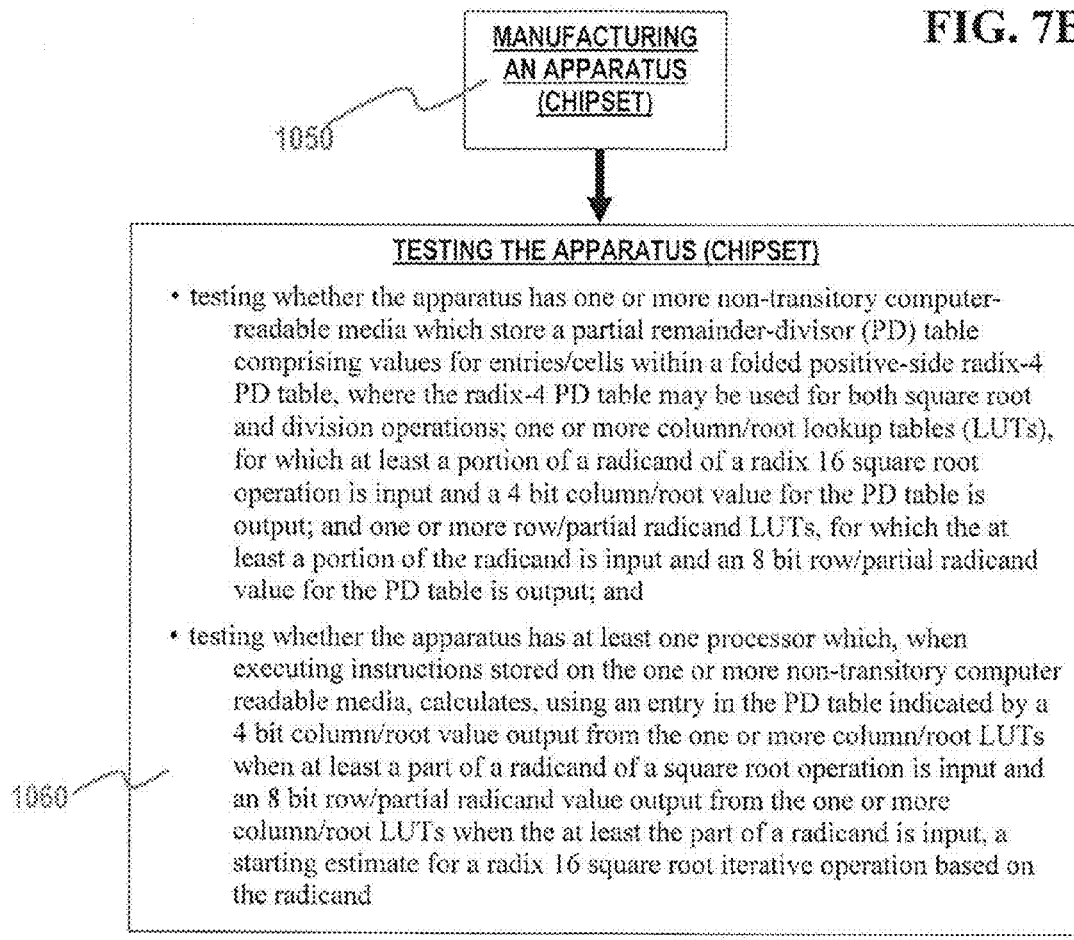
FIG. 7B illustrates a flowchart of an exemplary method for manufacturing and testing an apparatus according to an embodiment of the present disclosure.

FIG. 7B illustrates a flowchart of a method for manufacturing and testing an apparatus according to an embodiment of the present disclosure.

At 1050, the apparatus (in this instance, a chipset) is manufactured, including at least one processor and one or more non-transitory computer-readable media. When executing instructions stored on the one or more non-transitory computer readable media, the at least one processor performs the step of calculating, using an entry in the PD table indicated by a 4 bit column/root value output from the one or more column/root LUTs when at least a part of a radicand of a square root operation is input and an 8 bit row/partial radicand value output from the one or more column/root LUTs when the at least a part of a radicand is input, a starting estimate for a radix-16 square root iterative operation based on the radicand. The one or more non-transitory computer-readable media store a partial remainder-divisor (PD) table used for both radix-16 square root and radix-16 division iterative operations, one or more column/root lookup tables (LUTs), for which at least a portion of a radicand of a radix-16 square root operation is input and a column/root value for the PD table is output, and one or more row/partial radicand LUTs, for which the at least a portion of the radicand is input and a row/partial radicand value for the PD table is output.

At 1060, the apparatus (in this instance, a chipset) is tested. Testing 1060 includes testing whether the apparatus has at least one processor, which, when executing instructions stored on one or more non-transitory computer readable media, performs the step of calculating, using an entry in the PD table indicated by a 4 bit column/root value output from the one or more column/root LUTs when at least a part of a radicand of a square root operation is input and an 8 bit row/partial radicand value output from the one or more column/root LUTs when the at least a part of a radicand is input, a starting estimate for a radix-16 square root iterative operation based on the radicand; and testing whether the apparatus has the one or more non-transitory computer-readable media which store a partial remainder-divisor (PD) table used for both radix-16 square root and radix-16 division iterative operations; one or more column/root lookup tables (LUTs), for which at least a portion of a radicand of a radix-16 square root operation is input and a column/root value for the PD table is output; and one or more row/partial radicand LUTs, for which the at least a portion of the radicand is input and a row/partial radicand value for the PD table is output.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method of generating a starting estimate for a radix-16 square root iterative operation, comprising:
   determining, using at least a part of the radicand of the square root operation, a 4 bit root value to be used as a first coordinate value of a partial remainder-divisor (PD) table using one or more root lookup tables (LUTs), where the PD table is used for both radix-16 square root and radix-16 division operations, the PD table comprising values for entries/cells within a folded positive-side radix-4 PD table;
   determining, using the at least a part of the radicand, an 8 bit partial radicand value to be used as a second coordinate value of the PD table using one or more partial radicand LUTs; and
   determining, using an entry in the PD table indicated by the 4 bit root value and the 8 bit partial radicand value, a starting estimate for the radix-16 square root iterative operation.

2. The method of claim 1, wherein the PD table comprises multiple regions, including a region based on the folded positive-side radix-4 PD table ("radix-4 PD table region").

3. The method of claim 2, wherein determining the starting estimate for the radix-16 square root iterative operation comprises:

if the determined PD table entry is outside of the radix-4 PD table region, adjusting the root and partial radicand values to indicate an entry within the radix-4 PD table region.

4. The method of claim 3, wherein adjusting the root and partial radicand values to indicate an entry in the radix-4 PD table region comprises:
maintaining the root value while adjusting the partial radicand value based on which of the multiple regions the determined PD table entry is in.

5. The method of claim 4, wherein determining the root value, determining the partial radicand value, and maintaining the root value while adjusting the partial radicand value are performed in a first cycle.

6. The method of claim 2, wherein determining the starting estimate for the radix-16 square root iterative operation comprises:
determining whether the determined PD table entry is within one or more ranges of non-symmetrical PD table entries.

7. The method of claim 6, further comprising:
maintaining the partial radicand value from the first cycle while adjusting the root value, if the determined PD table entry is within the one or more ranges of non-symmetrical PD table entries; and
maintaining the adjusted root value of the re-adjusted PD table entry while re-adjusting the partial radicand value.

8. The method of claim 7, wherein maintaining the partial radicand value from the first cycle while adjusting the root value, if the root value from the first cycle is associated with a subnormal, exception, or special case, and maintaining the adjusted root value of the re-adjusted PD table entry while re-adjusting the partial radicand value are performed in a second cycle.

9. The method of claim 8, wherein the partial radicand value from the second cycle and the root value from the second cycle indicate an entry in the PD table to be used as the starting estimate for the radix-16 square root iterative operation.

10. The method of claim 1, wherein an input for the one or more root LUTs comprises the least significant bit (LSB) of an exponent portion of the radicand in IEEE-754 single precision floating point format and the 3 most significant bits (MSBs) of the fraction/mantissa portion of the radicand in IEEE-754 single precision floating point format.

11. The method of claim 1, wherein the one or more root LUTs comprise:
an even and an odd table as follows:

| E NNN | Out |
|---|---|
| EVEN | |
| 1000 | 0000 |
| 1001 | 0010 |
| 1010 | 0010 |
| 1011 | 0011 |
| 1100 | 0100 |
| 1101 | 0101 |
| 1110 | 0101 |
| 1111 | 0110 |
| ODD | |
| 0000 | 0111 |
| 0001 | 1001 |
| 0010 | 1010 |
| 0011 | 1011 |
| 0100 | 1100 |
| 0101 | 1110 |
| 0110 | 1110 |
| 0111 | 1111. |

12. The method of claim 1, wherein the one or more partial radicand LUTs comprise:
an even and an odd table as follows:

| E NNN | Out |
|---|---|
| EVEN | |
| 1000 | 0010_0001 |
| 1001 | 0010_0001 |
| 1010 | 0010_0110 |
| 1011 | 0010_0110 |
| 1100 | 0010_0110 |
| 1101 | 0010_0110 |
| 1110 | 0010_0110 |
| 1111 | 0010_0110 |
| ODD | |
| 0000 | 0011_1011 |
| 0001 | 0011_1011 |
| 0010 | 0011_1011 |
| 0011 | 0101_0111 |
| 0100 | 0101_0111 |
| 0101 | 0101_0111 |
| 0110 | 0110_0010 |
| 0111 | 0110_0010. |

13. The method of claim 1, wherein the PD table comprises:
regions A, B, C, D and E,
wherein a first portion of region A mirrors a second portion of region A with respect to a first coordinate axis,
wherein region B mirrors region C with respect to the first coordinate axis,
wherein region D mirrors region E with respect to the first coordinate axis,
wherein region B intermediates the first portion of region A and region D,
wherein region C intermediates the second portion of region A and region E, and
wherein region A comprises the radix-4 PD table region, regions B and C correspond to additional areas in a radix-8 PD table, regions D and E correspond to additional areas in a radix-16 PD table, and regions B, C, D, and E are outside the radix-4 PD table region.

14. An apparatus, comprising:
one or more non-transitory computer-readable media which store:
a partial remainder-divisor (PD) table comprising values for entries/cells within a folded positive-side radix-4 PD table;
one or more root lookup tables (LUTs), for which at least a portion of a radicand of a radix-16 square root operation is input and a 4 bit root value to be used as a first coordinate value of the PD table is output; and
one or more partial radicand LUTs, for which the at least a portion of the radicand is input and an 8 bit partial radicand value to be used as a second coordinate value of the PD table is output; and at least one processor which, when executing instructions stored on the one or more non-transitory computer readable media, performs the step of:
  determining, using an entry in the PD table indicated by a 4 bit root value output from the one or more root LUTs when at least a part of a radicand of a square root operation is input and an 8 bit partial radicand value output from the one or more root LUTs when the at least the part of a radicand is input, a starting estimate for a radix-16 square root iterative operation based on the radicand.

15. The apparatus of claim 14, wherein multiple regions for a radix-n PD Table are defined, where n is greater than 4, the radix-n PD table including the radix-4 PD table.

16. The apparatus of claim 15, wherein determining the starting estimate for a radix-16 square root iterative operation comprises:
  if the initial starting estimate is outside of the radix-4 PD table, adjusting the root and partial radicand values to indicate an entry/cell within the radix-4 PD table.

17. The apparatus of claim 16, wherein adjusting the root and partial radicand values to indicate an entry in the region based on the radix-4 PD table comprises:
  maintaining the root value while adjusting the partial radicand value based on which of the multiple regions the initial starting estimate is in.

18. The apparatus of claim 16, wherein the 4 bit root value is output, the 8 bit partial radicand value is output, and, if the initial starting estimate is outside of the radix-4 PD table, adjusting the root and partial radicand values to indicate an entry/cell within the radix-4 PD table are performed in a first cycle.

19. The apparatus of claim 14, wherein the processor determines the starting estimate for a radix-16 square root iterative operation by determining whether the initial starting estimate is within one or more ranges of non-symmetrical PD table entries.

20. The apparatus of claim 19, wherein the processor further performs:
  maintaining the partial radicand value from the first cycle while adjusting the root value, if the initial starting estimate is within the one or more ranges of non-symmetrical PD table entries; and
  maintaining the adjusted root value of the re-adjusted starting estimate while re-adjusting the partial radicand value,
  wherein maintaining the partial radicand value from the first cycle while adjusting the root value, if the initial starting estimate is within the one or more ranges of non-symmetrical PD table entries and maintaining the adjusted root value of the re-adjusted starting estimate while re-adjusting the partial radicand value are performed in a second cycle.

21. A method, comprising:
manufacturing a chipset comprising:
  one or more non-transitory computer-readable media which store:
    a partial remainder-divisor (PD) table comprising values for entries/cells within a folded positive-side radix-4 PD table;
    one or more root lookup tables (LUTs), for which at least a portion of a radicand of a radix-16 square root operation is input and a 4 bit root value to be used as a first coordinate value of the PD table is output; and
    one or more row/partial radicand LUTs, for which the at least a portion of the radicand is input and an 8 bit partial radicand value to be used as a second coordinate value of the PD table is output; and
  at least one processor which, when executing instructions stored on the one or more non-transitory computer readable media, performs the step of:
    determining, using an entry in the PD table indicated by a 4 bit root value output from the one or more root LUTs when at least a part of a radicand of a square root operation is input and an 8 bit partial radicand value output from the one or more root LUTs when the at least the part of a radicand is input, a starting estimate for a radix-16 square root iterative operation based on the radicand.

22. A method of testing an apparatus, comprising:
testing whether the apparatus has one or more non-transitory computer-readable media which store:
  a partial remainder-divisor (PD) table comprising values for entries/cells within a folded positive-side radix-4 PD table;
  one or more column/root lookup tables (LUTs), for which at least a portion of a radicand of a radix-16 square root operation is input and a 4 bit root value to be used as a first coordinate value of the PD table is output; and
  one or more row/partial radicand LUTs, for which the at least a portion of the radicand is input and an 8 bit partial radicand value to be used as a second coordinate value of the PD table is output; and
testing whether the apparatus has at least one processor which, when executing instructions stored on the one or more non-transitory computer readable media, performs the step of:
  determining, using an entry in the PD table indicated by a 4 bit root address value output from the one or more root LUTs when at least a part of a radicand of a square root operation is input and an 8 bit partial radicand address value output from the one or more root LUTs when the at least the part of a radicand is input, a starting estimate for a radix-16 square root iterative operation based on the radicand.

* * * * *